(12) United States Patent
Cater et al.

(10) Patent No.: US 9,954,572 B2
(45) Date of Patent: Apr. 24, 2018

(54) ENCLOSURE SEAL FOR AN ELECTRONIC DEVICE

(71) Applicant: Apple Inc., Cupertino, CA (US)

(72) Inventors: Tyler B. Cater, San Jose, CA (US); Derek C. Krass, San Francisco, CA (US); Rasamy Phouthavong, Campbell, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/236,157

(22) Filed: Aug. 12, 2016

(65) Prior Publication Data

US 2017/0047959 A1 Feb. 16, 2017

Related U.S. Application Data

(60) Provisional application No. 62/205,603, filed on Aug. 14, 2015.

(51) Int. Cl.
*H04M 1/18* (2006.01)
*H04B 1/3888* (2015.01)
*H04M 1/02* (2006.01)
*H04B 1/38* (2015.01)

(52) U.S. Cl.
CPC ............ *H04B 1/3888* (2013.01); *H04M 1/18* (2013.01); *H04B 2001/3894* (2013.01); *H04M 1/0249* (2013.01)

(58) Field of Classification Search
CPC ......... H04B 1/3888; H04B 2001/3894; H04M 1/0249
See application file for complete search history.

(56) References Cited

U.S. PATENT DOCUMENTS

| 5,946,395 | A | 8/1999 | Petrella et al. |
| 8,090,124 | B2 | 1/2012 | Nakagawa |
| 2007/0139915 | A1* | 6/2007 | Walters ............... H01M 2/1022 362/158 |
| 2009/0311975 | A1* | 12/2009 | Vanderaa ............. G01D 11/245 455/90.3 |
| 2013/0146491 | A1 | 6/2013 | Ghali et al. |
| 2015/0189963 | A1 | 7/2015 | Lai et al. |

* cited by examiner

*Primary Examiner* — David Bilodeau
(74) *Attorney, Agent, or Firm* — Brownstein Hyatt Farber Schreck, LLP

(57) ABSTRACT

An electronic device having an enclosure with a sealing element to prevent ingress of contaminants at an interface between sealing element and a material is disclosed. The material may include an injection molded material that forms at least part of a radio frequency transparent window. The enclosure may include a first channel that receives the material. A second channel may open to the first channel and receive the sealing element. The sealing element may initially extend at least partially into the first channel. However, the material may provide compression forces to the sealing element to compress the sealing element out of the first channel, or at least compress the sealing element further into the second channel. The sealing element may provide a counterforce against the material to increase or enhance a seal against ingress attempting to pass through the enclosure at the interface between sealing element and the material.

20 Claims, 8 Drawing Sheets

ENCLOSURE SEAL FOR AN ELECTRONIC DEVICE

CROSS-REFERENCE TO RELATED APPLICATION(S)

This application claims the benefit of priority under 35 U.S.C. § 119(e) to U.S. Provisional Application No. 62/205,603, filed on Aug. 14, 2015, and titled "ENCLOSURE SEAL FOR AN ELECTRONIC DEVICE," the disclosure of which is incorporated herein by reference in its entirety.

FIELD

The present embodiments relate generally to a sealing element, or gasket, in an electronic device. In particular, the present embodiments relate to using the sealing element to prevent ingress from entering through the electronic device. The sealing element may be disposed in an opening of the electronic device and also compressed against one or more structural components disposed in the opening.

BACKGROUND

Electronic devices are known to include a metal enclosure that prevents passage of radio frequency ("RF") emission through the metal enclosure. In order to allow RF transmission through the metal enclosure, the metal enclosure may include a region void of, or absent, metal to define an RF opening.

However, the RF opening exposes the electronic device to ingress of contaminants, such as water. Even when an RF-transparent material is disposed in the RF opening, the contaminants may nonetheless pass through one or more interface regions between an outer surface of the RF opening and the RF-transparent material. Also, the RF-transparent material may include small openings that contribute to ingress.

SUMMARY

In one aspect, an electronic device is described. The electronic device may include an enclosure defining an internal volume. The enclosure may include a first channel and a second channel. The electronic device may further include a sealing element disposed in the first channel. The electronic device may further include an injection molded part disposed in the second channel. In some instances, the injection molded part may apply pressure to compress the sealing element to form a barrier between the sealing element and the injection molded part to prevent ingress into the internal volume.

In another aspect, an electronic device having a radio circuit for providing a radio frequency signal used for wireless communication is described. The electronic device may include an enclosure that carries the radio circuit within an internal region. The enclosure may include a first channel and a second channel opening to the first channel. The electronic device may further include a first injection molded element disposed within the internal region. The first injection molded element may combine with the enclosure to define the first channel. The electronic device may further include a second injection molded element disposed in the first channel. The second injection molded element may combine with the first injection molded element to form a radio frequency transparent window. The electronic device may further include a sealing element disposed in the second channel and compressed by the radio frequency transparent window to form a barrier between the sealing element and the radio frequency transparent window.

In another aspect, a method for forming an electronic device that includes an enclosure having a first channel that opens to a second channel is described. The method may include molding a sealing element in an expanded state within the first channel. The method may further include injection molding a moldable material within the second channel such that the sealing element transitions from the expanded state to a compressed state. By a molding operation, such as injection molding, an ingress barrier can be formed between the moldable material and the sealing element.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
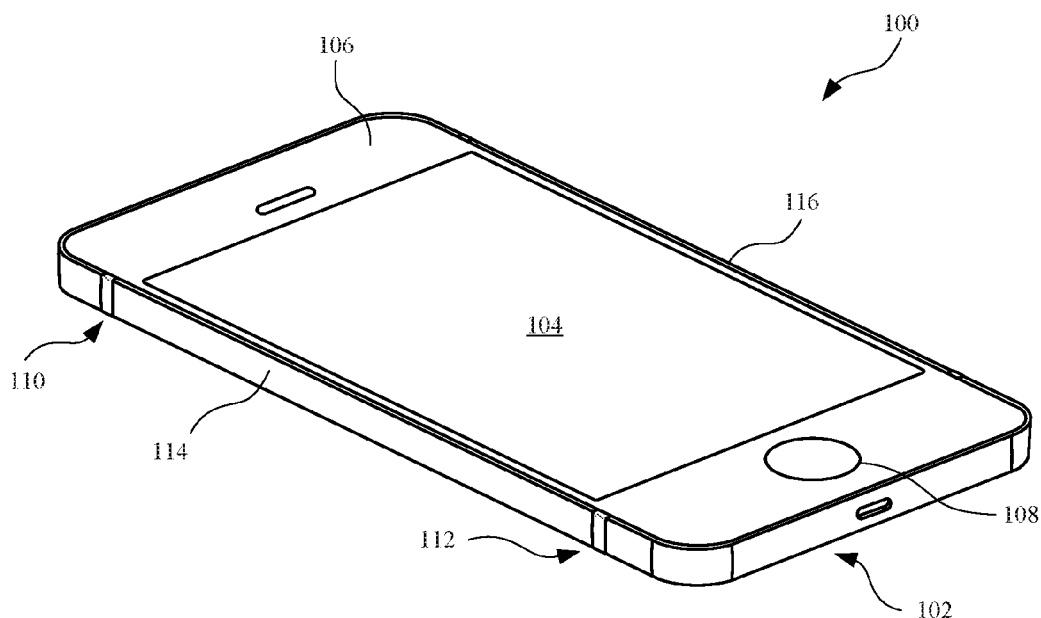
FIG. 1 illustrates an isometric view of an embodiment of an electronic device, in accordance with the described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to an electronic device that includes a sealing element, or gasket. The sealing element may provide, in part, a barrier against ingress of contaminants (such as liquids) into the electronic device. The sealing element may be disposed in an enclosure of the electronic device, and in particular, in a channel, or recess, of the enclosure that provides at least part of an opening of the enclosure to permit radio frequency ("RF") communication through the enclosure.

The sealing element may engage a layer of material in the recess, and combine with the layer to prevent ingress of contaminants (such as liquids) into the electronic device at an interface region between the sealing element and the layer. When the enclosure is formed from a metal (such as aluminum), the enclosure may prevent one or more operational components (such as radio circuits) from transmitting and receiving RF communication. Accordingly, in order for the electronic device to include wireless communication capabilities and maintain a substantially rigid (metal) enclosure, the enclosure may include a channel (previously described) filled with one or more layers of material that, unlike metal, allow transmission of RF energy through the layer(s). In other words, the selected layer (or layers) of material does not block or prohibit RF communication. In order to limit or prevent ingress of contaminants into the electronic device, the sealing element may engage at least one of the RF-permissive layers as well as the enclosure, and provide a barrier against the ingress.

As an exemplary embodiment, the enclosure may include a first layer disposed in an interior region generally associated with an internal cavity defined by the enclosure, with the internal cavity receiving several internal components. The first layer may include a rigid plastic or resin designed to provide structural rigidity and structural support, particularly in locations of the enclosure that do not include metal, such as the recess. However, the material (or materials) used to form the first layer may allow transmission of RF energy.

The enclosure may further include an exterior region generally associated with an outer, cosmetic region or surface visible when the electronic device is assembled. The exterior region may undergo a material removal operation (or operations) to form a first channel along the exterior region. The material removal operation may not only remove a portion of the enclosure, but may also remove a portion of the first layer located in the internal region. Also, an additional material removal operation in the exterior recess may be used to form a second (additional) channel. The second additional channel may open to the first channel and receive the sealing element. In some cases, the sealing element is disposed in the second channel using an over mold operation that not only positions the sealing element in the second channel, but also allows the sealing element to expand into the first channel. The sealing element may also include a material (or materials) that may allow RF communication to pass through the sealing element.

The enclosure may further include a second layer substantially disposed in the remaining space of the first channel (not occupied by the sealing element and/or the first layer). As an example, an injection molding process may mold the second layer into the first channel subsequent to a curing operation to the sealing element. The second layer may be formed from a relatively soft plastic or polymeric material. Further, the second layer may be designed to enhance a cosmetic appearance of the enclosure (and in turn, the electronic device). In this regard, in some cases, the second layer includes a color similar to a color of the enclosure. However, other colors are possible. During installation, the second layer may provide a force or pressure to the sealing element due in part the molding operation (of the second layer). As a result, the second layer may at least partially compress the sealing element such that the sealing element is further positioned in the second channel, and in some cases, is compressed such that the sealing element is no longer in the first channel. As a result, an ingress barrier may form at an interface region between the second layer and the sealing element. Further, when compressed, the sealing element may provide a counterforce to the second layer. Accordingly, the sealing element and the second layer may provide opposing forces against each other. With the sealing element and the second layer pressed against each other at the interface region, an enhanced ingress barrier may be formed at the interface region to further enhance the ingress barrier.

Also, the second layer may include a material (or materials) that allows RF communication to pass through the second layer. In this manner, the enclosure may include a substantially metal enclosure having an RF-transparent window, formed in part by the first layer and the second layer, with the sealing element providing support in the form of ingress protection for the RF-transparent window. Accordingly, the internal components of the electronic device may be shielded from ingress.

These and other embodiments are discussed below with reference to FIGS. 1-15. However, those skilled in the art will readily appreciate that the detailed description given herein with respect to these Figures is for explanatory purposes only and should not be construed as limiting.

FIG. 1 illustrates an isometric view of an embodiment of an electronic device 100, in accordance with the described embodiments. In some embodiments, the electronic device 100 is a tablet computer device. In other embodiments, the electronic device 100 is a wearable electronic device, such as an electronic watch. In the embodiment shown in FIG. 1, the electronic device 100 is a portable electronic device, such as a smartphone designed for wireless communication.

The electronic device 100 may include an enclosure 102. The enclosure 102 may be formed from rigid material that provides a protective cover for several internal components (not shown) of the electronic device 100. In some embodiments, the enclosure 102 includes a metal, such as steel (including stainless steel), aluminum, or an alloy that includes at least one of the aforementioned metals. The electronic device 100 may further include a display 104 designed to present visual content. The display 104 may include a capacitive layer integrally formed with the display 104 to allow the display 104 to respond to a capacitive coupling, which may generate in input or command to a processor circuit (not shown) disposed in the enclosure 102, thereby altering the visual content presented on the display 104. In some embodiments, as shown in FIG. 1, an outer protective layer 106 overlays the display 104. The outer protective layer 106 may be formed form a transparent material, such as glass or sapphire, as non-limiting examples. Also, the electronic device 100 may include a button 108 designed to receive an input or control that may control one or more operations thereby controlling the visual content shown on the display 104.

Also, the electronic device 100 may include one or more antennae (not shown) coupled with one or more radio circuits (not shown) disposed between the enclosure 102 and the display 104. The antennae and radio circuits may combine to allow the electronic device 100 to send and receive radio frequency ("RF") communication using protocols such as Bluetooth, wireless communication in accordance with 802.11 wireless standards ("Wi-Fi"), and/or cellular network communication. However, when the enclosure 102 is formed from a metal, the antennae may be prevented from transmitting or receiving RF communication. In this regard, the enclosure 102 may include one or more regions void of, or absent, metal or other RF-blocking materials. For example, as shown in FIG. 1, the enclosure 102 may include a first channel 110 and a second channel 112, both of which are at least partially void of metal that forms the enclosure 102. As shown, the first channel 110 and the second channel 112 may extend along the enclosure 102 and include a material (or materials) allowing RF communication to pass through the material (or materials). Accordingly, the material (or materials) may define an RF-transparent window for the aforementioned antennae and radio circuits. This will be discussed below. Also, the first channel 110 and the second channel 112 may extend from a first sidewall 114 of the enclosure 102 to a second sidewall 116 opposite the first sidewall 114.

Figure 2:
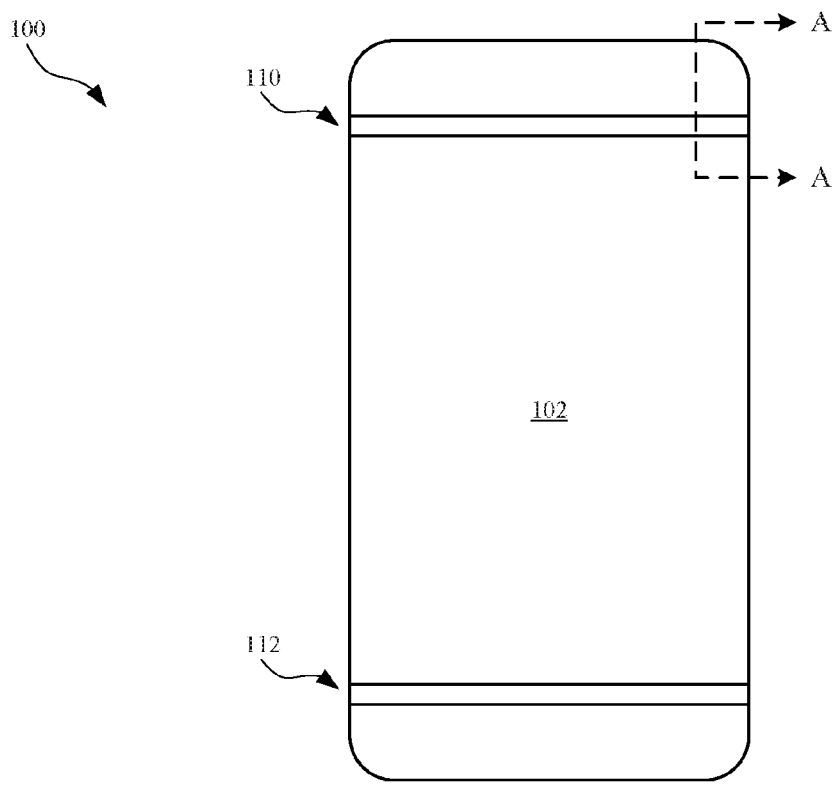
FIG. 2 illustrates a plan view of the electronic device shown in FIG. 1, showing a rear portion of the electronic device, and in particular, of the enclosure.

FIG. 2 illustrates a plan view of the electronic device 100 shown in FIG. 1, showing a rear portion of the electronic device 100, and in particular, of the enclosure 102. The rear portion of the enclosure 102, as shown in FIG. 2, may also represent an external region of the enclosure 102 generally visible when the electronic device 100 is assembled. As shown, the first channel 110 and the second channel 112 may extend across a surface of the enclosure 102. Although not shown, portions of the enclosure 102 hidden by the first channel 110 and the second channel 112 may extend across the first channel 110 and the second channel 112 in order to bridge together sections of the enclosure 102. However, in other embodiments, the enclosure 102 may be split into separate pieces and mechanically interlocked together. Also, although not shown, the enclosure 102 may include additional channels that combine with the first channel 110 and/or the second channel 112 to increase a size of an RF-transparent window.

Figure 3:
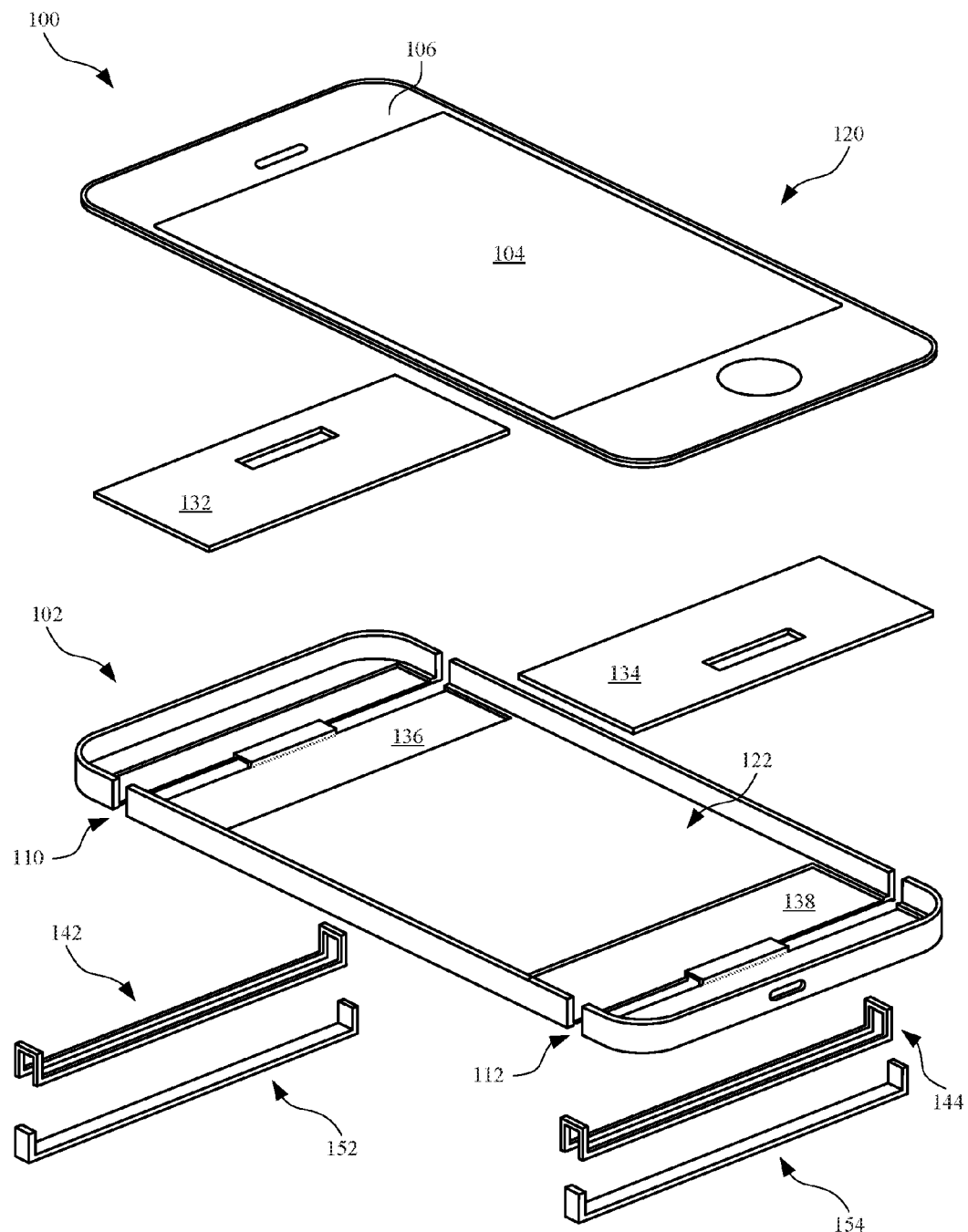
FIG. 3 illustrates an exploded view of the electronic device shown in FIG. 1, showing various features of the electronic device.

FIG. 3 illustrates an exploded view of the electronic device 100 shown in FIG. 1, showing various features of the electronic device 100. For purposes of simplicity, several features—memory circuits, battery, processor circuits, antennae, radio circuits, etc.—are removed. Also, for purposes of illustration, some features may be disproportional or exaggerated to show detail. As shown, the electronic device 100 may include a display assembly 120 that that includes features such as the display 104 and the outer protective layer 106, both of which are previously described. Also, the first channel 110 and the second channel 112 may define openings in the enclosure 102 that are void or absent of material that forms the enclosure 102.

The electronic device 100 may include one or more layers of material disposed in an internal region 122 defined by the enclosure 102. For example, the electronic device 100 may include several inner layers, such as a first inner layer 132 and a second inner layer 134, disposed in locations of the internal region 122 corresponding to the first channel 110 and the second channel 112, respectively. The first inner layer 132 and the second inner layer 134 may be formed from a composition of materials that includes, as non-limiting examples, plastic or resin. Further, the plastic or resin may be combined with particles such as glass, metal (e.g., aluminum), or a combination thereof. However, the first inner layer 132 and the second inner layer 134 may include only a relatively small amount of metal so as to not disrupt RF communication through the first inner layer 132 and the second inner layer 134. As a result, the first inner layer 132 and the second inner layer 134, when cured, form a relatively rigid and stiff structure designed to add support to the enclosure 102 at the first channel 110 and the second channel 112, respectively.

In some embodiments, the first inner layer 132 and the second inner layer 134 are injection molded to the enclosure 102. Further, the enclosure 102 may include a first internal recess 136 and a second internal recess 138 that receive the first inner layer 132 and the second inner layer 134, respectively. Also, in some embodiments, prior to forming the first channel 110 and the second channel 112, the first inner layer 132 and the second inner layer 134 are applied to the enclosure 102. Then, subsequent to receiving the first inner layer 132 and the second inner layer 134, the enclosure 102 may undergo a material removal operation to define the first channel 110 and the second channel 112. Further, the material removal operation may not only remove a portion of the enclosure 102, but also a portion of the first inner layer 132 and a portion of the second inner layer 134. This will be shown and discussed below.

The enclosure 102 may further include additional features at the channels. For example, the enclosure 102 may include a first sealing element 142 and a second sealing element 144 positioned in the first channel 110 and the second channel 112, respectively. In some embodiments, the first sealing element 142 and the second sealing element 144 are pre-assembled O-rings. In other embodiments, the first sealing element 142 and the second sealing element 144 are injection molded in the first channel 110 and the second channel 112, respectively. The first sealing element 142 and the second sealing element 144 may extend along a perimeter of the first channel 110 and the second channel 112, respectively. However, in other embodiments, the first sealing element 142 and the second sealing element 144 may extend only in selected, or predetermined, locations of the perimeter of their respective channels. Also, the sealing elements may be disposed in cavities (shown later) defines as smaller channels that open to the first channel 110 and the second channel 112. Further, the sealing elements may engage a portion of, and bond with, their respective inner layers. This will be shown below. Also, an adhesive or primer (not shown) may be applied to cavities and/or inner layers in order to secure the sealing elements with the enclosure 102.

The enclosure 102 may include a first outer layer 152 and a second outer layer 154 designed to engage the first sealing element 142 and the second sealing element 144, respectively. The first outer layer 152 and the second outer layer 154 may be located at least partially along an exterior region of the enclosure 102. In some embodiments, the first outer layer 152 and the second outer layer 154 are injection molded in the first channel 110 and the second channel 112, respectively. Also, the first outer layer 152 and the second outer layer 154 may be formed from a relatively soft plastic designed to enhance a cosmetic appearance of the enclosure 102. In some cases, the outer layers are molded to the channels following a curing operation of the sealing elements. For example, the first sealing element 142 may be molded into the first channel 110 (or channel opening to the first channel 110) and cured (from a liquid form to a solid form). Then, the first outer layer 152 may be injection molded in the first channel 110 to engage the first sealing element 142.

Also, the outer layers may combine with their respective sealing elements to define sealing barriers in the channels to prevent ingress of contaminants. In this regard, the outer layers, when disposed in the channels, may apply a pressure or force to their respect sealing elements. For example, when the first outer layer 152 is injection molded into the first channel 110, the force or pressure associated with the injection molding operation may cause the first sealing element 142 to compress at or near an interface between the first sealing element 142 and the first outer layer 152. Accordingly, the first sealing element 142 may include a material (or materials) designed to compress in response to the injection molding operation. Further, the first sealing element 142 may provide a counterforce to the first outer layer 152 to enhance the seal at the interface region such that the first sealing element 142 presses against the first outer layer 152, and vice versa. This will be further shown and discussed below.

In some embodiments, the first sealing element 142 and the second sealing element 144 are formed from a thermoset elastomeric material molded to the enclosure 102. In this regard, the sealing elements may include silicone (including liquid silicone rubber) that may be injection molded or compression molded (in liquid form) to the enclosure 102. Alternatively, the sealing elements may include polyurethane, a fluoroelastomer (including an FKM fluoroelastomer), or an extremely durable synthetic rubber such as ethylene propylene diene monomer ("EPDM"). In other embodiments, the sealing elements are formed from a thermoplastic elastomer molded to the enclosure 102. In this regard, the sealing elements may include a thermoplastic polyurethane ("TPU"). Alternatively, or in combination, the sealing elements may include a thermoplastic elastomer ("TPE"). Also, the thermoplastic elastomer may include an amorphous nylon or a PA 12 elastomer.

Regardless of the chosen material for the sealing elements, the sealing elements may include some common characteristics. For example, the material (or materials) selected to form the sealing elements may include a melting temperature greater than that of the material (or materials) selected to form the outer layers, such as the first outer layer 152 and the second outer layer 154. In this manner, once the sealing elements are cured in their respective channels, the sealing elements may not melt in response to heat from the outer layers during a molding operation of the outer layers to the enclosure 102. As an example, when the sealing elements are formed from a liquid silicone rubber, the sealing elements may include a melting temperature of approximately 700 degrees Celsius. The outer layers, when formed from a polymeric material, may include a melting temperature of approximately 400 degrees Celsius.

Further, in some cases, the sealing elements are applied to the enclosure 102 prior to the enclosure 102 receiving an anodic bath. The anodic bath may include a chemical submersion of the enclosure 102 in one or more acidic compounds designed to form an oxidation layer on the enclosure 102. This is performed in order to, for example, improve the finish (in terms of appearance) and durability of the enclosure 102. However, the sealing elements (as well as the inner and outer layers) may be made from a chemically resistant material (or materials) such that the sealing elements do not break down from exposure to the anodic bath.

In addition, the coefficient of thermal expansion ("CTE") between the sealing element and the outer layer may be taken into account according to the selection of materials used for the sealing element and the outer layer. For example, during operation of an electronic device, the electronic device may include one or more heat-generating components (such as integrated circuits) that cause heat that dissipates from the heat-generating component to the outer layer. As such, the outer layer may expand due to the heat, then contract when the heat is dissipated away from the outer layer. However, the sealing element may include a material (or materials) designed to accommodate for a change in shape of the outer layer due in part to thermal expansion (and contraction thereafter). For example, the sealing element may include an elastically deformable material (or materials) such that an expansion of the outer layer may cause further compression of the sealing element, or conversely, a contraction of the outer layer may cause an expansion of the sealing element. In either event, the sealing element may be designed to maintain contact with the outer layer. Also, as the channels define an RF opening for the electronic device, the inner layers, the sealing elements, and the outer layers may be formed from "RF-transparent" materials that do not interfere with RF communication.

FIGS. 4-8 describe an assembly operation of several features shown and described in FIG. 3. Some additional features, however, may also be described throughout FIGS. 4-8. Also, FIGS. 4-8 show and describe an assembly operation at the first channel 110. However, the assembly operation at the second channel 112 may be substantially similar to that of the first channel 110. Further, several components, including the display 104 and the outer protective layer 106, are removed in FIGS. 4-8.

Figure 4:
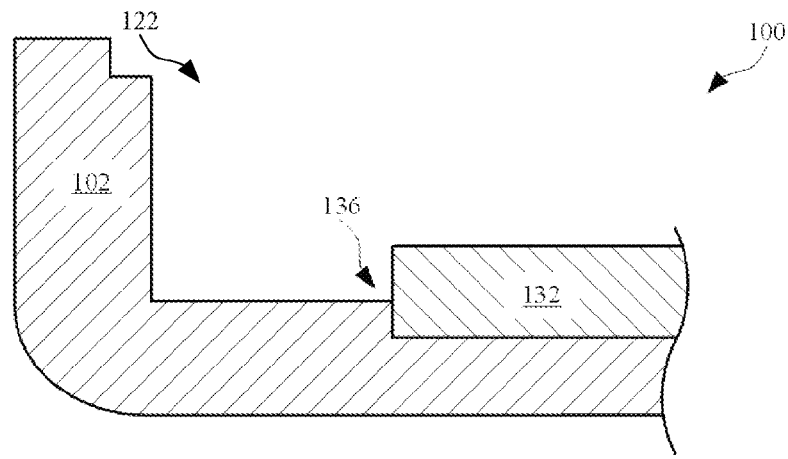
FIG. 4 illustrates a cross sectional view of the electronic device taken along line A-A shown in FIG. 2, showing the first inner layer disposed in the interior region of the enclosure.

FIG. 4 illustrates a cross sectional view of the electronic device 100 taken along line A-A shown in FIG. 2, showing the first inner layer 132 disposed in the internal region 122 of the enclosure 102. In some embodiments, the first inner layer 132 is disposed in the internal region 122 by an injection molding operation. As shown, the first inner layer 132 may be at least partially disposed in the first internal recess 136. Although not shown, in some embodiments, the enclosure 102 does not include the first internal recess 136 and the first inner layer 132 is disposed over a planar interior surface of the enclosure 102.

Figure 5:
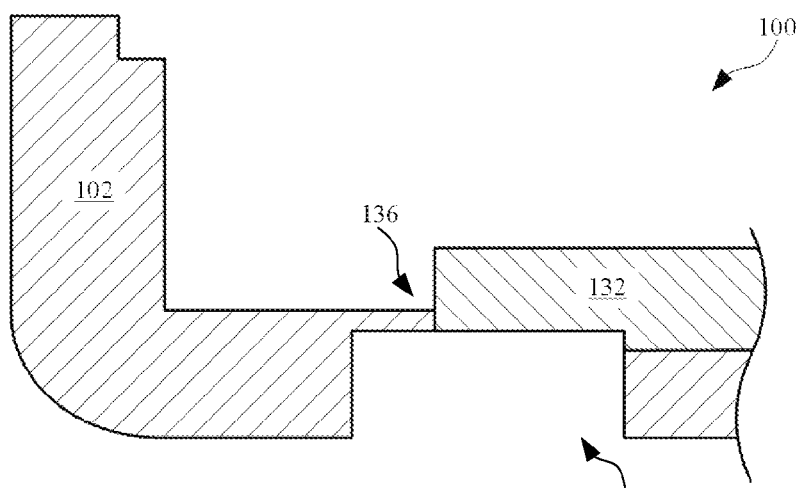
FIG. 5 illustrates a cross sectional view of the electronic device shown in FIG. 4, subsequent to the enclosure undergoing a material removal operation.

FIG. 5 illustrates a cross sectional view of the electronic device 100 shown in FIG. 4, subsequent to the enclosure 102 undergoing a material removal operation. In some embodiments, as shown in FIG. 5, the material removal operation used to remove material from the enclosure 102 may also remove a portion of the first inner layer 132. The material removal operation defines the first channel 110 (which may also be referred to as an exterior recess of the enclosure 102). Also, the material removal operation to form the first channel 110 may cause an "overlap" into the first internal recess 136 such that the material used to form the enclosure 102 is absent, providing an RF transparent region of the enclosure 102. Also, as shown, the material removal operation may remove a portion of the first inner layer 132.

Figure 6:
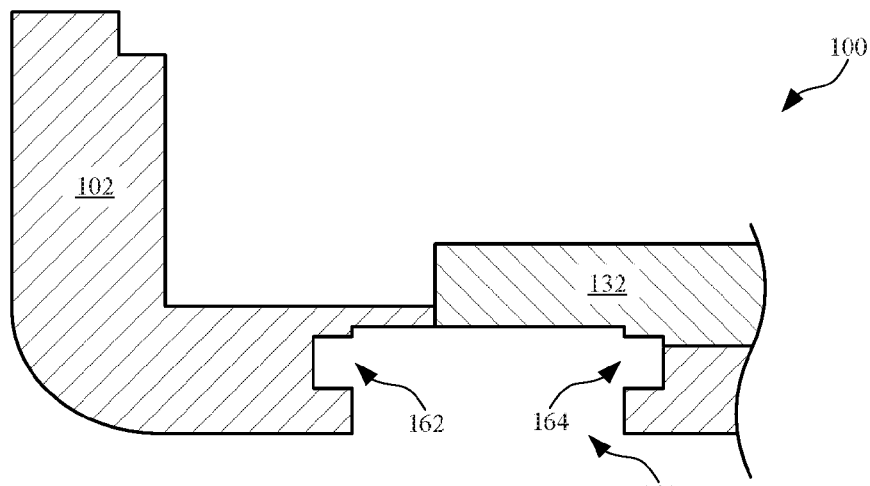
FIG. 6 illustrates a cross sectional view of the electronic device shown in FIG. 5, with the enclosure having undergone an additional material removal operation.

FIG. 6 illustrates a cross sectional view of the electronic device 100 shown in FIG. 5, with the enclosure 102 having undergone an additional material removal operation. For example, the additional material removal operation may alter the first channel 110 to include a second channel 162 and a third channel 164. As shown, the second channel 162 and the third channel 164 may open to the first channel 110, and accordingly, the second channel 162 and the third channel 164 may also be referred to cavities formed in the enclosure 102. Also, the second channel 162 and the third channel 164 may extend along the perimeter of the first channel 110 or in any location of the first channel 110 in which a sealing element (shown later) may be disposed. Also, the additional material removal operation used to form the cavity regions may also remove a portion of the inner layers. For example, as shown in FIG. 6, the additional material removal operation used to form the third channel 164 also removes a portion of the first inner layer 132.

Figure 7:
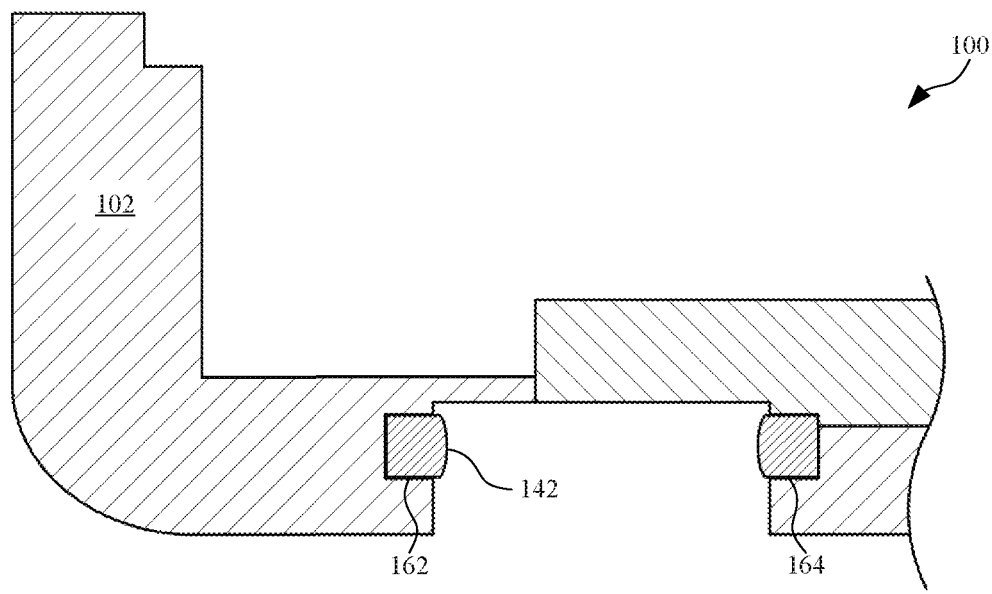
FIG. 7 illustrates a cross sectional view of the electronic device shown in FIG. 6, with a sealing element disposed in the cavity region of the enclosure.

FIG. 7 illustrates a cross sectional view of the electronic device 100 shown in FIG. 6, with the first sealing element 142 disposed in the cavity region of the enclosure 102. The first sealing element 142 may be molded into the second channel 162 and the third channel 164 by, for example, an injection molding operation. Further, an over molding operation may cause the first sealing element 142 to extend into portions the first channel 110, as shown in FIG. 7, defining an expanded state of the first sealing element 142. In other words, the first sealing element 142 may protrude beyond the second channel 162 and the third channel 164. Also, although not shown, the first sealing element 142 may be adhesively secured with the enclosure 102 in the aforementioned cavities by an adhesive.

Figure 8:
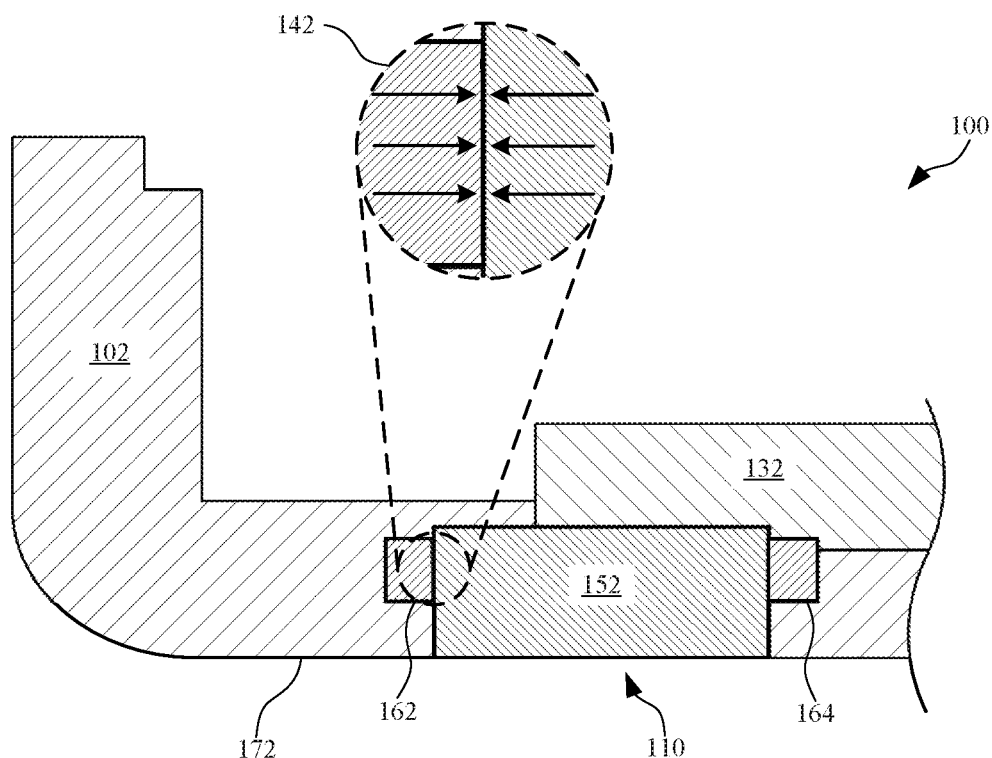
FIG. 8 illustrates a cross sectional view of the electronic device shown in FIG. 7, showing the first outer layer disposed in the first channel.

FIG. 8 illustrates a cross sectional view of the electronic device 100 shown in FIG. 7, showing the first outer layer 152 disposed in the first channel 110. The first outer layer 152 may include a material molded in first channel 110 by an injection molding operation, as a non-limiting example. Further, the first outer layer 152 may be applied to the first channel 110 such that the first outer layer 152 is co-planar, or flush, with respect to an exterior surface 172 of the enclosure 102. Also, although not shown, the first outer layer 152 may be mechanically interlocked into the first channel 110.

The molding operation of the first outer layer 152 into the first channel 110 may cause a force or pressure to the first sealing element 142 at or near an interface region between the first sealing element 142 and the first outer layer 152. For example, an injection molding operation of the first outer layer 152 into the first channel 110 may provide to the first outer layer 152 a compression force applied to and compressing the first sealing element 142. The force applied to the first sealing element 142 by the first outer layer 152 may cause the first sealing element 142 to compress into the cavity regions. In this manner, the portions of the first sealing element 142 previously protruding from the second channel 162 and the third channel 164 and into the first channel 110 (as shown in FIG. 7) may compress, or at least partially compress, into the second channel 162 and the third channel 164. As shown in the enlarged view in FIG. 8, the force (denoted by arrows pointing toward the first sealing element 142) applied by the first outer layer 152 to the first sealing element 142 causes a portion of the first sealing element 142 to compress into the second channel 162. However, at least some of the material of the first sealing element 142 may provide a counterforce (denoted by arrows pointing toward the first outer layer 152) to the first outer layer 152 at an interface region between the first sealing element 142 and the first outer layer 152. Accordingly, the first sealing element may combine with the first outer layer 152 to form a sealing barrier at the interface region and prevent ingress from passing through the enclosure 102 at the interface region (between the first sealing element 142 and the first outer layer 152). In this manner, any ingress entering the first channel 110 may be prevented from further ingress at the interface region between first sealing element 142 and the first outer layer 152. Moreover, the opposing forces applied by the first sealing element 142 and the first outer layer 152 may enhance ingress protection capabilities. It will be appreciated that the interplay (namely, the opposing forces) between the first sealing element 142 and the first outer layer 152 near the third channel 164 may be substantially similar as that for the second channel 162. Also, similar opposing forces at interface regions between the first sealing element 142 and the first outer layer 152 may extend along any region in which the first sealing element 142 engages the first outer layer 152.

Also, as shown in FIG. 8, the first inner layer 132 may engage the first outer layer 152 to form a region of the enclosure 102 that is substantially free of any RF-blocking material. As such, even when the enclosure 102 is formed from a metal, the electronic device 100 may still provide RF communication by an RF-transparent window defined by the first inner layer 132 and the first outer layer 152. It should be noted that the first sealing element 142 may include RF-transparent material so as to not impede RF communication.

FIGS. 9-14 illustrate alternate embodiments of a sealing element suitable for use in an enclosure of an electronic device. It will be appreciated that any material and/or features previously described for an enclosure, an inner layer, a sealing element, and an outer layer may be suitable for use with an enclosure, an inner layer, a sealing element, and an outer layer, respectively, in FIGS. 9-14. Also, similar compressive forces and counterforces between the outer layers and the sealing elements shown in FIG. 8 may also be present in FIGS. 9-14. Further, although FIGS. 9-14 include cross sectional views of an electronic device, the electronic devices may be similar to an electronic device previously described.

Figure 9:
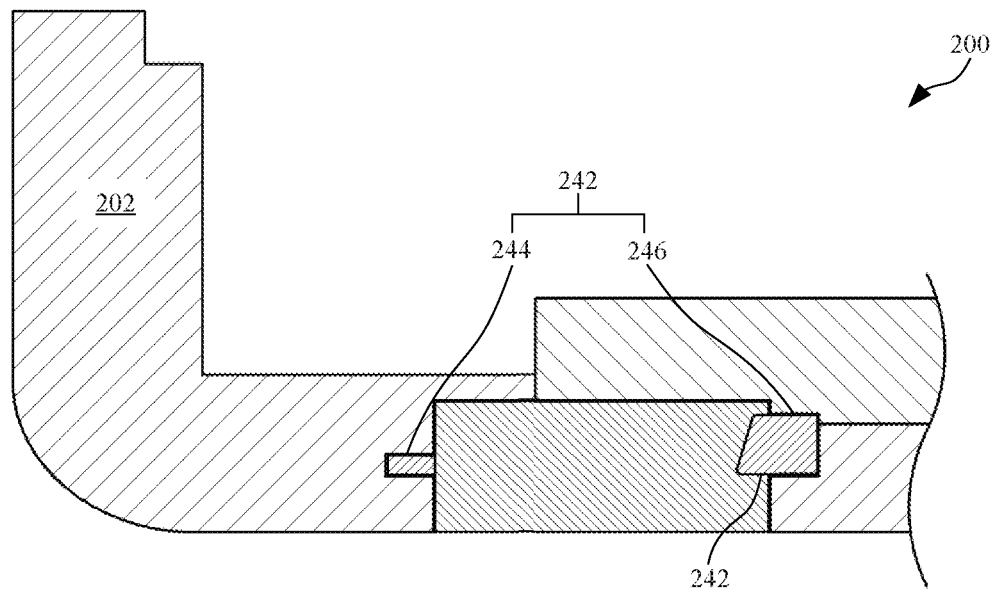
FIG. 9 illustrates a cross sectional view of an alternate embodiment of an electronic device, with the sealing element having an asymmetric design.

In some cases, the sealing element may include an asymmetric design. For example, FIG. 9 illustrates a cross sectional view of an alternate embodiment of an electronic device 200, with the sealing element 242 having an asymmetric design. As shown, a sealing element 242 may include a first portion 244 having a first shape (denoted by the cross section) and a second portion 246 having a second shape (denoted by the cross section) different than the first shape. The asymmetric design may allow the sealing element 242 to conform to, or accommodate, various constraints in the electronic device 100 and to adjust to different contours or curves in the enclosure 202. Also, it should be noted that the cavity regions that receive the first portion 244 and the second portion 246 may at least partially define a shape of the first portion 244 and the second portion 246.

Figure 10:
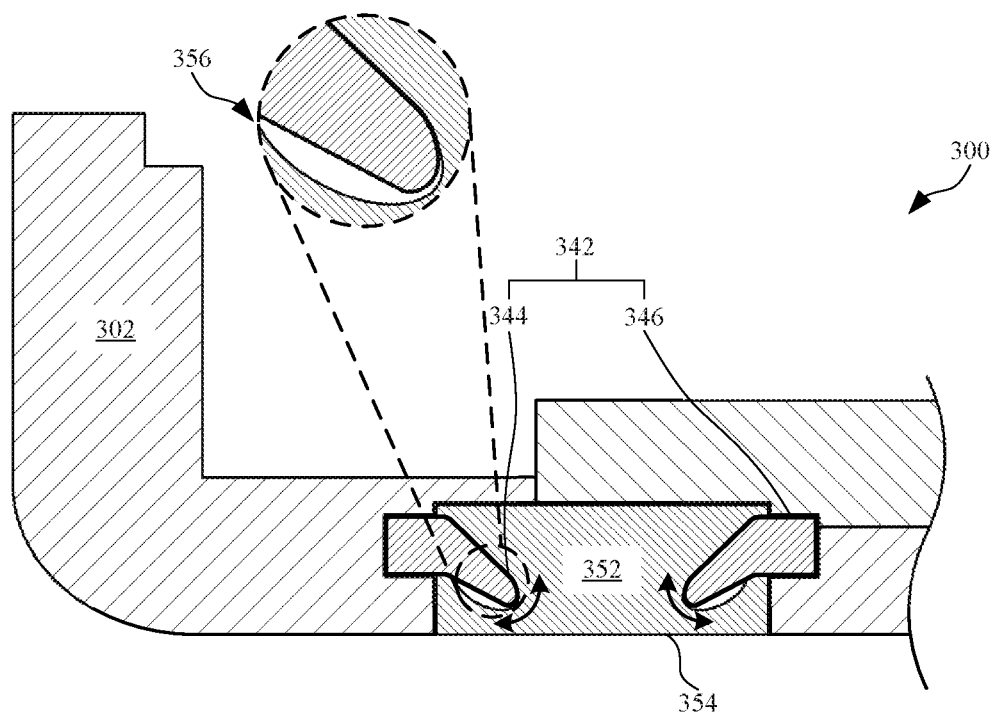
FIG. 10 illustrates a cross sectional view of an alternate embodiment of an electronic device having a sealing element with flap features designed to move in response to movement of the outer layer.

FIG. 10 illustrates a cross sectional view of an alternate embodiment of an electronic device 300 having a sealing element 342 with flap features designed to move in response to movement of the outer layer 352. As shown, the sealing element 342 may include a first flap 344 and a second flap 346. The first flap 344 and the second flap 346 may be designed to move in response to movement of the outer layer 352. For example, the outer layer 352 may expand in response heat generated from an internal component (not shown) of the electronic device 300. In response to the expansion of the outer layer 352, the outer layer 352 provide an additional force to the first flap 344 and the second flap 346, causing the first flap 344 and the second flap 346 to move in a direction toward an exterior surface 354 of the outer layer 352. Conversely, the outer layer 352 may contract in response heat dissipating from the outer layer 352. In response to the contraction of the outer layer 352, the forces from outer layer 352 may be removed, allowing the first flap 344 and the second flap 346 move in a direction away from the exterior surface 354 and return to their initial positions. In either event, the first flap 344 and the second flap 346 may allow the sealing element 342 to maintain continuous contact with the outer layer 352 to provide a sealing barrier against ingress regardless of any movement of the outer layer 352. Accordingly, the sealing element 342 may work in conjunction with the outer layer 352 despite CTE differences between the sealing element 342 and the outer layer 352.

Also, the electronic device 300 may be subjected to certain undesired forces. For example, a user may drop the electronic device 300, causing the enclosure 302 crash against an object. However, in some embodiments, the outer layer 352 may include an opening 356 that defines a space or void (in the outer layer 352) adjacent to the sealing element 342. For example, as shown in the enlarged view, the opening 356 (or space) between the first flap 344 and the outer layer 352 may allow the first flap 344 to shift throughout the opening 356 when a force exerted on the electronic device 300 causes the enclosure 302 to move or shift relative to the outer layer 352. In this manner, even if the first flap 344 shifts into the opening 356, the first flap 344 may nonetheless maintain contact with the outer layer 352, thereby maintaining the sealing barrier at an interface region between the first flap 344 and the outer layer 352. Also, it should be understood that the opening 356 may extend along any location between the first flap 344 and the second flap 346 in a manner similar to that shown in FIG. 10. The outer layer 352 may also include an opening (not labeled) adjacent to the second flap 346.

Figure 11:
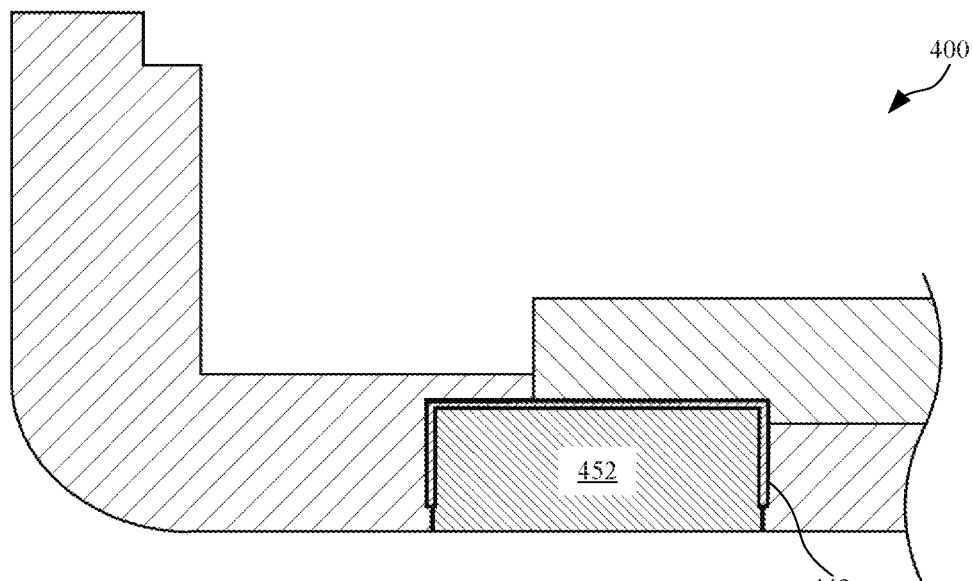
FIG. 11 illustrates a cross sectional view of an alternate embodiment of an electronic device that includes a sealing element substantially wrapped around an outer layer, in accordance with the described embodiments.

In some cases, the sealing element may be disposed along additional surfaces of the outer layer. For example, FIG. 11 illustrates a cross sectional view of an alternate embodiment of an electronic device 400 that includes a sealing element 442 substantially wrapped around an outer layer 452, in accordance with the described embodiments. The may allow for an increased interface region between the sealing element 442 and the outer layer 452 in order to provide additional ingress protection. For example, as shown in FIG. 11, sealing element 442 engages the outer layer 452 along three separate and distinct surfaces of the outer layer 452.

Figure 12:
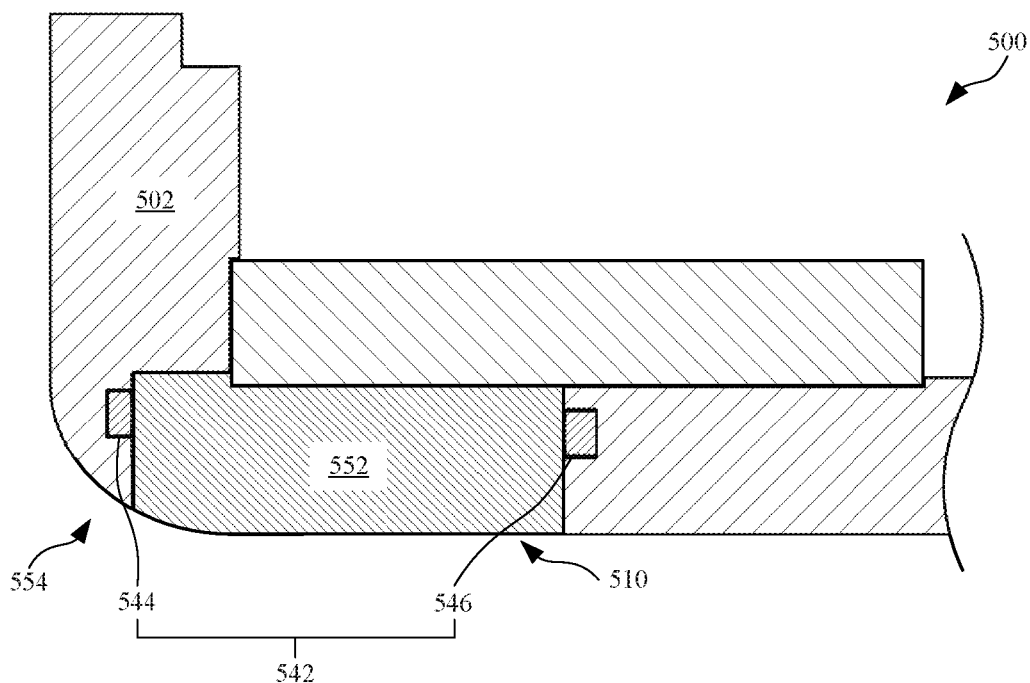
FIG. 12 illustrates a cross sectional view of an alternate embodiment of an electronic device, showing an outer layer disposed along a curved region of an enclosure of the electronic device, in accordance with the described embodiments.

FIG. 12 illustrates a cross sectional view of an alternate embodiment of an electronic device 500, showing an outer layer 552 disposed along a curved region 554 of an enclosure 502 of the electronic device 500, in accordance with the described embodiments. The curved region 554 may be defined in part by an interface of a rear portion of the enclosure 502 and a sidewall of the enclosure 502, in a manner shown in FIG. 12. Also, the enclosure 502 may not only accommodate an outer layer 552 along the curved region 554, but may also accommodate a channel 510 along the curved region 554. Also, the electronic device 500 may include a sealing element 542 having an asymmetric design. For example, the sealing element 542 may include a first portion 544 and a second portion 546, with the first portion 544 elevated with respect to the second portion 546. Also, as shown in FIG. 12, the cavity regions may be designed to accommodate the sealing element 542, and in particular, the first portion 544 and the second portion 546.

Figure 13:
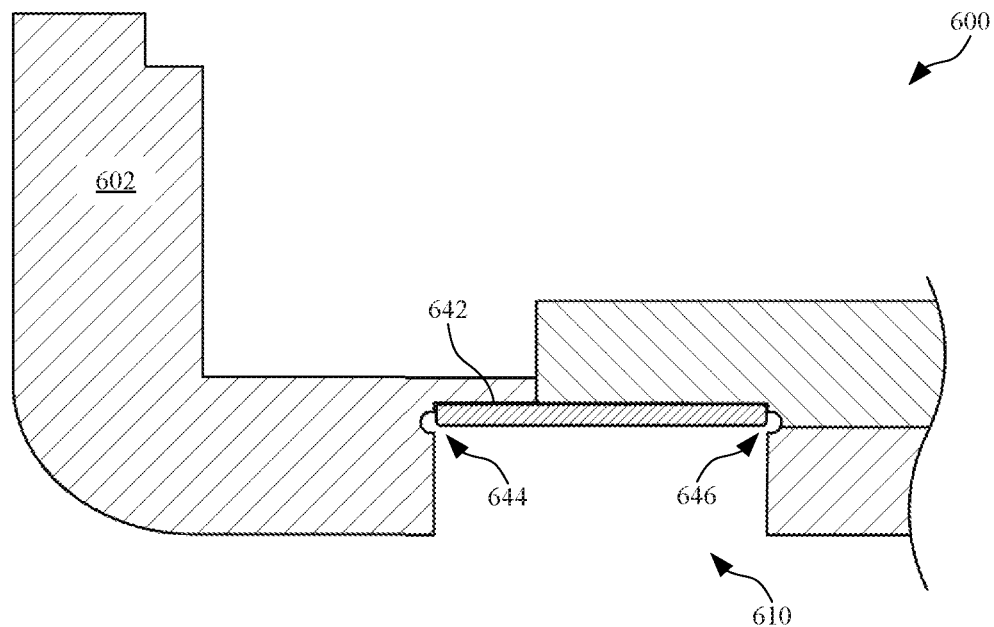
FIG. 13 illustrates a cross sectional view of an alternate embodiment of an electronic device having an enclosure with a cavity region designed to accommodate a sealing element when the sealing element receives an external force or pressure.

FIG. 13 illustrates a cross sectional view of an alternate embodiment of an electronic device 600 having an enclosure 602 with a cavity region designed to accommodate a sealing element 642 when the sealing element 642 receives an external force or pressure. As shown, the enclosure 602 may include a first cavity 644 disposed at one end of the sealing element 642, and a second cavity 646 dispose at another (opposite) end of the sealing element 642. Also, both the first cavity 644 and the second cavity 646 may open to a channel 610 of the enclosure 602.

Figure 14:
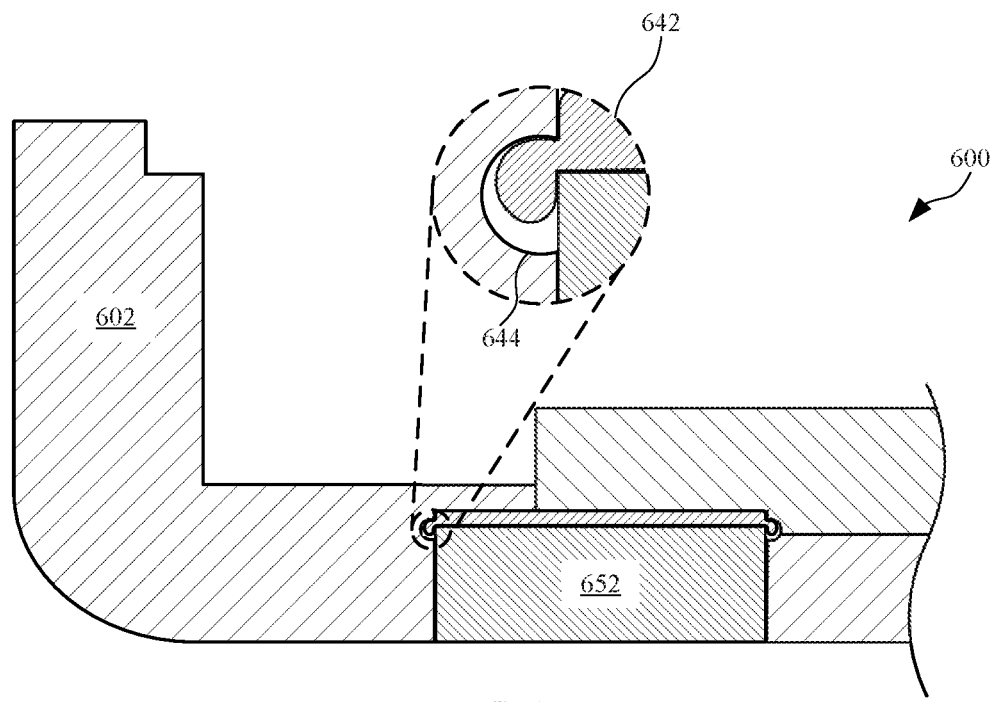
FIG. 14 illustrates a cross sectional view of the electronic device shown in FIG. 13, further showing an outer layer disposed in the channel.

FIG. 14 illustrates a cross sectional view of the electronic device 600 shown in FIG. 13, further showing an outer layer 652 disposed in the channel 610. When the outer layer 652 is positioned in the channel 610 by, for example, an injection molding operation, a force or pressure from the outer layer 652 (based upon the injection molding operation) may be applied to the sealing element 642, causing a portion of the sealing element 642 to extend into the first cavity 644 and the second cavity 646 (labeled in FIG. 13). As shown in the enlarged view in FIG. 14, the sealing element 642 may remain engaged with the outer layer 652 even when a portion of the sealing element 642 extends into the first cavity 644. This may increase an interface region between the sealing element 642 and the outer layer 652 to provide additional ingress protection for the electronic device 600.

Figure 15:
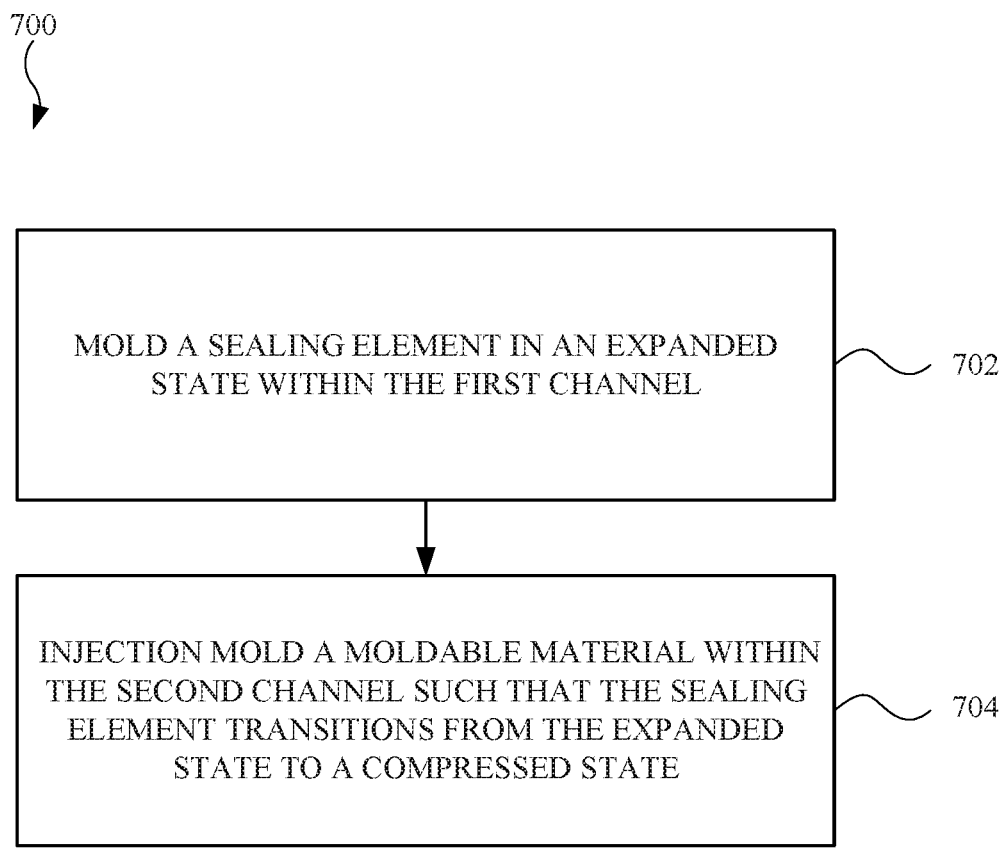
FIG. 15 illustrates a flowchart showing a method for forming an electronic device that includes an enclosure having a first channel that opens to a second channel, in accordance with the described embodiments.

FIG. 15 illustrates a flowchart 700 showing a method for forming an electronic device that includes an enclosure having a first channel that opens to a second channel, in accordance with the described embodiments. The enclosure may include an internal region that carries a radio circuit to provide the electronic device with wireless communication capabilities. Also, the enclosure may further include an internal recess and a channel that at least partially opens to the internal recess.

In step 702, a sealing element is molded an expanded state within the first channel. The sealing element may include moldable materials, such as liquid silicone rubber, that cures after molding operation. Also, the molding operation may include injection molding.

In step 704, a moldable material is injection molded within the second channel such that the sealing element transitions from the expanded state to a compressed state, thereby forming an ingress barrier between the moldable material and the sealing element. The moldable material may include a cosmetic plastic that is flush, or co-planar, with respect to the enclosure. In some embodiments, the injection molding operation causes an applied pressure to the moldable material, which the causes the sealing element to transition from the expanded state to a compressed state. As a result, an ingress barrier is formed between the sealing element and the moldable material to prevent ingress (including liquid ingress) from entering the enclosure through the channels, or through an opening near the channels.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
   an enclosure defining an internal volume and comprising:
      a first channel recessed relative to an exterior surface of the enclosure and defined at least partially by first and second side walls extending from the exterior surface of the enclosure to a bottom of the first channel; and
      a second channel in the first side wall;
   a sealing element disposed in the second channel; and
   an injection molded part disposed in the first channel, the injection molded part applying pressure to compress the sealing element to form a barrier between the sealing element and the injection molded part to prevent ingress into the internal volume.

2. The electronic device of claim 1, wherein the injection molded part engages the sealing element.

3. The electronic device of claim 2, further comprising an additional injection molded part disposed in the internal volume and engaged with the injection molded part, wherein the injection molded part and the additional injection molded part comprise RF transparent material and form a radio frequency transparent window for wireless communication.

4. The electronic device of claim 1, wherein the sealing element comprises a thermoset elastomeric material.

5. The electronic device of claim 1, wherein an exterior surface of the injection molded part is co-planar with respect to the exterior surface of the enclosure.

6. An electronic device having a radio circuit for providing a radio frequency signal used for wireless communication, the electronic device comprising:
   an enclosure that carries the radio circuit within an internal region, the enclosure comprising:
      a first channel defined by:
         a bottom surface recessed from an exterior surface of the enclosure; and
         at least two side surfaces; and
      a second channel positioned in at least one of the at least two side surfaces;
   a first injection molded element disposed within the internal region, the first injection molded element combining with the enclosure to define at least a portion of the first channel;
   a second injection molded element disposed in the first channel, the second injection molded element combining with the first injection molded element to form a radio frequency transparent window; and
   a sealing element disposed in the second channel and compressed by the radio frequency transparent window to form a barrier between the sealing element and the radio frequency transparent window.

7. The electronic device of claim 6, wherein the sealing element provides a counterforce to the radio frequency transparent window.

8. The electronic device of claim 6, wherein an exterior surface of the second injection molded element is co-planar with respect to the exterior surface of the enclosure.

9. The electronic device of claim 6, wherein the sealing element comprises thermoset elastomeric material.

10. The electronic device of claim 9, wherein the thermoset elastomeric material comprises liquid silicone rubber.

11. The electronic device of claim 6, wherein the first channel includes a first size and shape, and wherein the second channel includes a second size and shape different from the first size and shape.

12. The electronic device of claim 6, wherein the second channel is smaller than the first channel.

13. A method for forming an electronic device that includes an enclosure having a first channel defined at least partially by first and second side walls extending from an exterior surface of the enclosure to a bottom of the first channel, and a second channel in the first side wall, the method comprising:
   molding a sealing element in an expanded state within the second channel; and
   injection molding a moldable material within the first channel such that the sealing element transitions from the expanded state to a compressed state, thereby forming an ingress barrier between the moldable material and the sealing element.

14. The method as recited in claim 13, further comprising molding an additional moldable material that engages the moldable material, the additional moldable material providing structural support to the enclosure.

15. The method of claim 13, wherein the moldable material allows passage of a radio frequency signal and includes an exterior surface that is co-planar with respect to an exterior surface of the enclosure.

16. The method as recited in claim 15, wherein the enclosure carries a radio frequency circuit capable of generating the radio frequency signal used for wireless communication.

17. The method as recited in claim 13, wherein the sealing element provides a counterforce to the moldable material.

18. The method of claim 13, wherein the enclosure is formed of a metal.

19. The method of claim 13, wherein molding the sealing element within the second channel comprises injection molding the sealing element.

20. The electronic device of claim 1, wherein the first and second side walls are substantially parallel to each another.

* * * * *